(12) United States Patent
Rindt et al.

(10) Patent No.: US 6,892,968 B1
(45) Date of Patent: May 17, 2005

(54) NOZZLE ASSEMBLY FOR USE IN THE TREATMENT OF WASTE WATER

(76) Inventors: John R. Rindt, 1219 83rd St. South, Grand Forks, ND (US) 58201; Don V. Mathsen, 1011 19th Ave. South, Grand Forks, ND (US) 58201

( * ) Notice: Subject to any disclaimer, the term of this patent is extended or adjusted under 35 U.S.C. 154(b) by 210 days.

(21) Appl. No.: 10/314,393

(22) Filed: Dec. 5, 2002

(51) Int. Cl.$^7$ .............................. B05B 1/14; A62C 2/08
(52) U.S. Cl. .................. 239/553.5; 239/548; 239/552; 239/553.3; 239/482; 239/469
(58) Field of Search .......................... 239/553.5, 548, 239/552, 553, 553.3, 554, 556, 461, 463, 239/469, 523, 482, 488, 553.12

(56) References Cited

U.S. PATENT DOCUMENTS

| | | | |
|---|---|---|---|
| 3,640,472 A * | 2/1972 | Hruby et al. ............... 239/552 |
| 3,793,690 A * | 2/1974 | Wayne ..................... 29/890.02 |
| 3,932,282 A | 1/1976 | Ettelt ........................ 210/195 |
| 4,360,156 A * | 11/1982 | Soth et al. .................... 239/11 |
| 4,655,395 A * | 4/1987 | Cioffi et al. ................. 239/427 |
| 5,381,957 A * | 1/1995 | Bianco ........................ 239/99 |
| 6,074,554 A | 6/2000 | Ray et al. ................... 210/194 |
| 6,126,815 A | 10/2000 | Kelada ........................ 210/94 |
| 6,415,993 B1 * | 7/2002 | Forbert et al. .............. 239/434 |

* cited by examiner

Primary Examiner—Davis Hwu
(74) Attorney, Agent, or Firm—Thomte, Mazour & Niebergall; Shane M. Niebergall

(57) ABSTRACT

A nozzle for use in treating waste water is provided with a hollow body member having fluid inlets and outlets. A glide tube having a tapered interior is positioned within the body member. A boulet is positioned within the glide tube to form a pressure drop zone and an expansion zone between the glide tube and the boulet. The fluid inlet receives highly or super-saturated liquid from which micro bubbles of gas are produced within the pressure drop and expansion zones. The fluid outlet discharges the liquid and micro bubbles to a desired point of use.

16 Claims, 3 Drawing Sheets

NOZZLE ASSEMBLY FOR USE IN THE TREATMENT OF WASTE WATER

BACKGROUND OF THE INVENTION

This invention relates to a nozzle assembly for use in the treatment of waste water and more particularly to a nozzle assembly for producing micro bubbles from air-saturated waste water.

DESCRIPTION OF THE RELATED ART

The use of small air bubbles in the separation of suspended solids from processed waste water has been known for some time. Typically, the process is referred to as dissolved air floatation or DAF. In dissolved air floatation (DAF), air at high pressure is dissolved in a slipstream of the waste water to be treated and introduced into a floatation tank at a low pressure along with the rest of the waste stream. When the pressure is reduced, micrometer-size air bubbles are released and rise through the liquid pool contacting and lifting any floatable suspended matter to the surface of the liquid pool.

Floatation units typically refer to their efficiency in two generalized numerical formats. The first is (1) as the surface area required to separate a unit mass of solids, while the second is (2) the percent solids in the separated, solids rich process stream. The development and application of micro bubbles (typically around 30 micron mean bubble diameter) to the separation of waste water solid from waste water has shown that smaller bubbles can lead to higher loadings of solids per unit area. The process of producing micro bubbles is a two-stage process. The first is to saturate a portion of the clean effluent with air at an elevated pressure. The higher the pressure, the more air available to the resulting mixture of super-saturated water-air solution and waste water stream for lifting suspended solids. The super-saturated water-air mixture is then exposed to high pressure drops in a carefully crafted nozzle. Such nozzles are often complex or not easily adapted for use with different devices used to produce the highly or super-saturated water-air mixture. Other nozzles of less complex design are frequently inefficient and produce air bubbles that are large or coarse, which are undesirable.

Accordingly, what is needed is an improved nozzle for use in the treatment of waste water that is simple in construction and efficient in the production of micro bubbles.

SUMMARY OF THE INVENTION

A nozzle for use in the treatment of waste water is disclosed comprising a hollow body member having closed lower and upper ends. A fluid inlet is formed in the lower end of the body member for supplying liquid that is highly or super-saturated with a gas to the lower end of the body member. A glide tube having an interior portion and lower and upper end portions is disposed within the body member adjacent the fluid inlet. A boulet is disposed within the glide tube closely adjacent the fluid inlet. A fluid outlet is provided in the upper end portion of the body member for discharging liquid and micro bubbles of gas.

The positioning of the boulet within the glide tube forms an open pressure drop zone between the boulet and the glide tube adjacent the fluid inlet. The location of the boulet further provides for an open expansion zone between the boulet and the interior portion of the glide tube, which is partially defined by upwardly and outwardly tapering inner glide tube walls. The highly or super-saturated liquid-gas mixture passes through the pressure drop zone and into the expansion zone. As the liquid-gas mixture passes through the zones, micro bubbles of the gas are produced from the liquid-gas mixture. The liquid and micro bubbles are then selectively purged from the nozzle via the fluid outlet to a desired point of use. The nozzle is of simple construction that efficiently produces micro bubbles from a highly or super-saturated liquid-gas mixture.

It is therefore a principal object of the present invention to provide an improved nozzle for use in the treatment of waste water.

It is a further object of the present invention to provide a nozzle that receives highly or super-saturated liquid-gas mixtures and dispenses a mixture of liquid and micro bubbles of gas.

It is a further object of the present invention to provide a nozzle for the production of micro bubbles of gas from a liquid-gas mixture that is efficient and simple in construction.

These and other objects will be apparent to those skilled in the art.

DESCRIPTION OF THE PREFERRED EMBODIMENT

Figure 1:
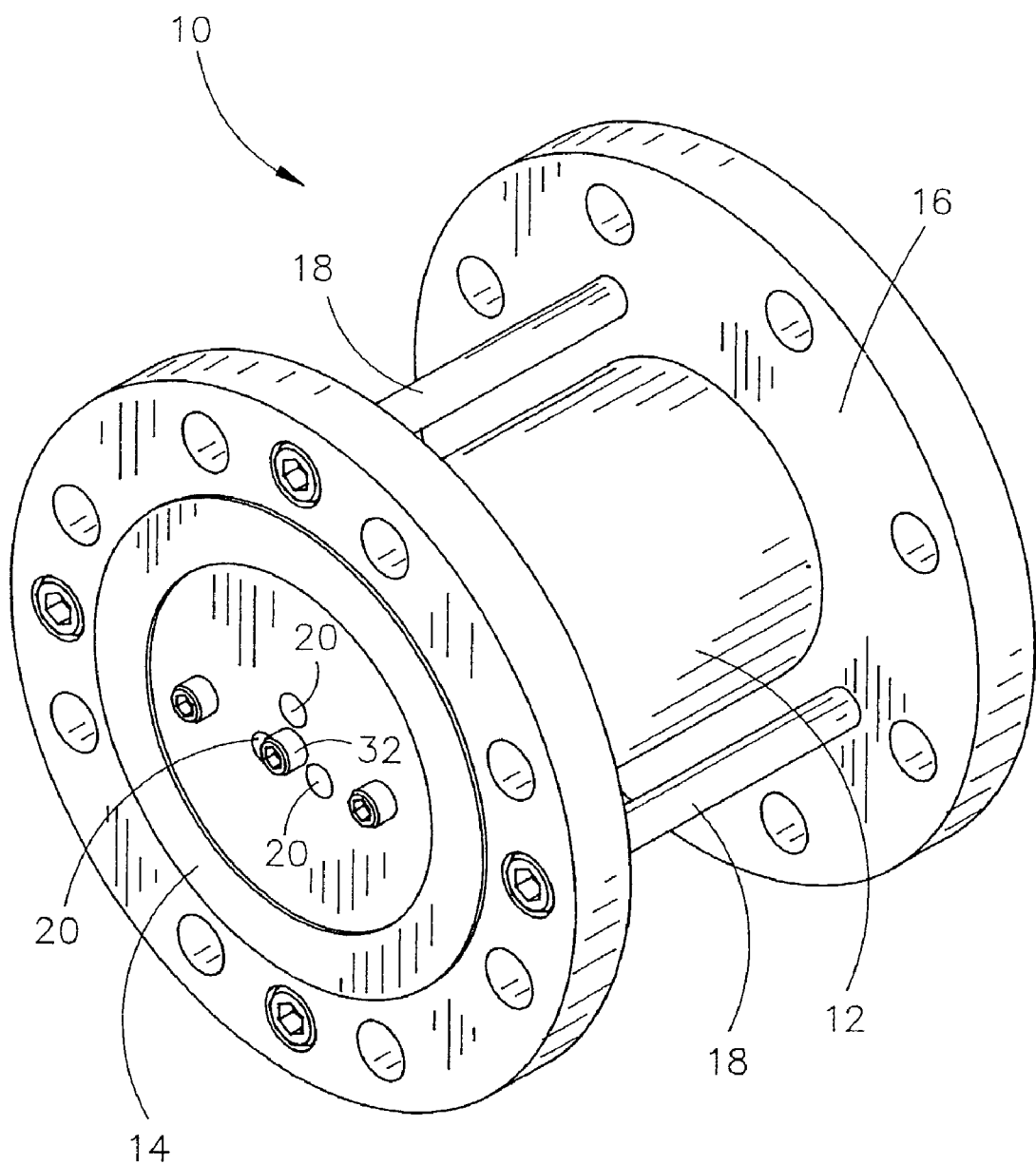
FIG. 1 is a perspective view of the nozzle of the present invention.
Figure 2:
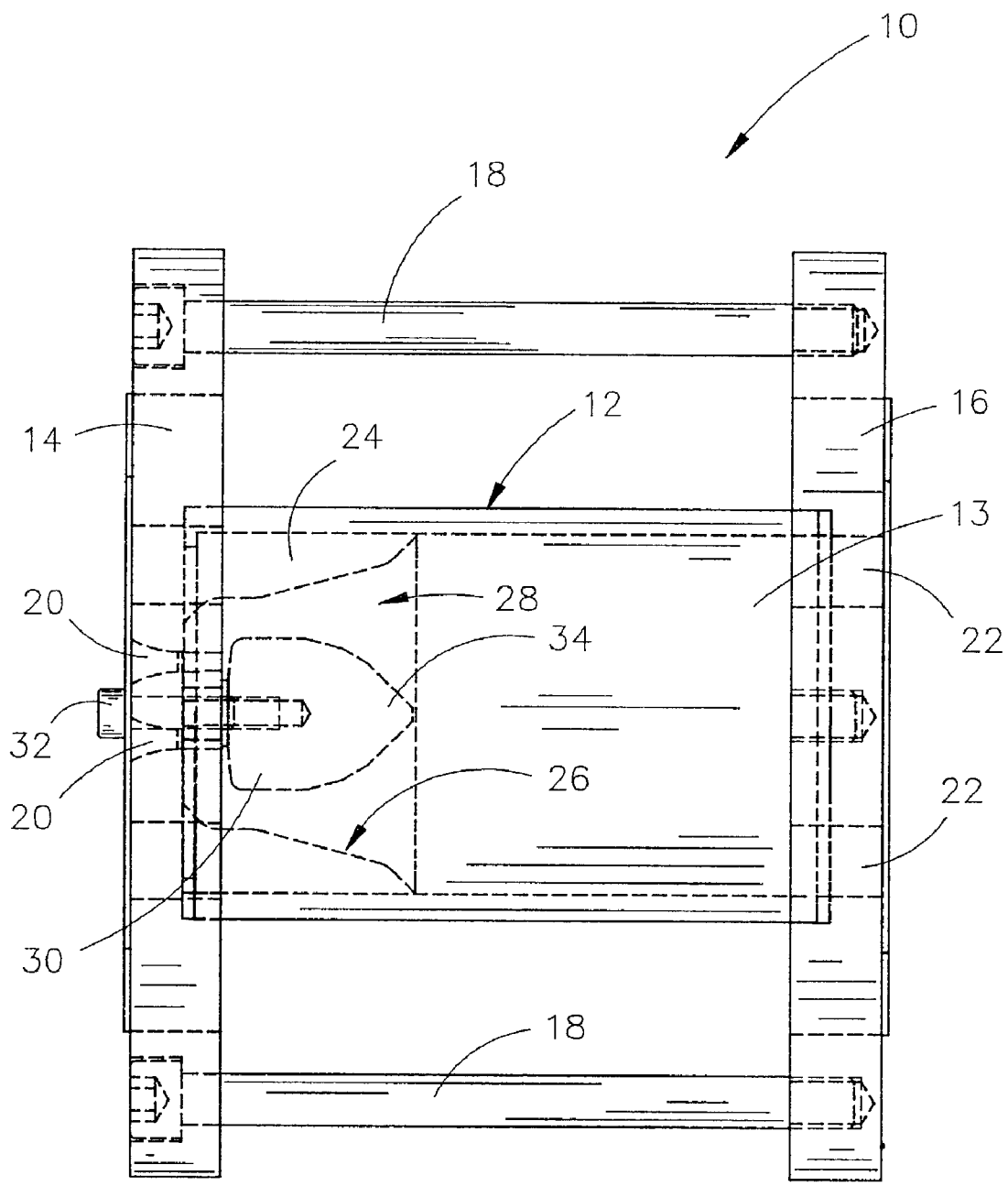
FIG. 2 is a side elevational view of the nozzle of the present invention with portions thereof cut away to more fully illustrate the invention.

The nozzle of this invention is referred to generally by the reference numeral 10 and includes a hollow body member 12 having an interior chamber 13 and lower and upper end portions 14 and 16, respectively. The nozzle 10 will typically be used as a component of a system for treating waste water and will be used with water that is highly or super-saturated with air. However, it is contemplated that the nozzle 10 will be used in other applications and may use other liquids and gases. As depicted in FIGS. 1 and 2, it is preferred that the nozzle be constructed so that the lower and upper end portions 14 and 16 are provided using a nozzle plate and pass-through plate, respectively, which are secured to the body member 12 by bolts 18 or the like to effectively close the body member 12. It is contemplated, however, that the end portions could be integrally formed with the body member 12. At least one fluid inlet 20 is formed in the lower end portion 14 of the body member 12. However, it is preferred that a plurality of fluid inlets 20 be provided, as depicted. The fluid inlets 20 are mirrored by at least one fluid outlet 22 formed in the upper end portion 16 of the body member 12. However, a plurality of fluid outlets 20 can be provided, as depicted.

A glide tube 24, having a lower end portion and an upper end portion is disposed within the body member 12, closely adjacent the fluid inlets 20 so that the fluid inlets 20 and the interior portion 28 of the glide tube 24 are in open fluid communication with one another. The inner surface 26 of the glide tube 24 is preferably shaped in a generally upwardly and outwardly manner as depicted in FIG. 2, which forms the shaped interior portion 28. A boulet 30 is disposed within the interior portion 28 of the glide tube 24, closely adjacent the fluid inlet 20. The boulet 30 is operatively secured to the lower end portion 14 of body member 12 by a bolt 32 or the like. The boulet 30 is shaped to have an upper end portion 34 that generally tapers in an upward and inward direction as depicted in FIG. 2.

Figure 3:
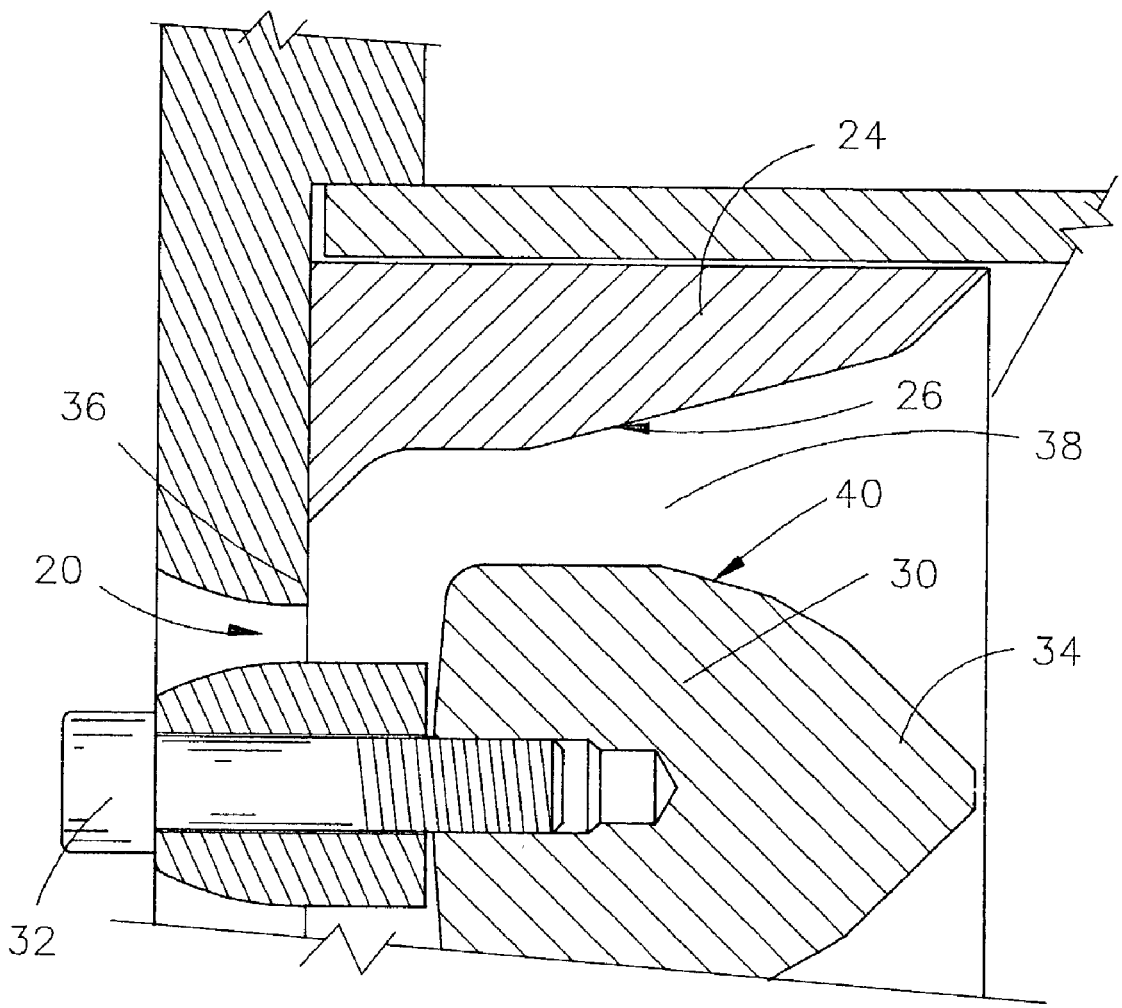
FIG. 3 is a partial sectional view of the upper end portion of the invention with portions thereof cut away to more fully illustrate the invention.

As illustrated by FIG. 3, the boulet 30 is secured within the interior portion 28 of the glide tube 24 so that a generally crescent-shaped pressure drop zone 36 is formed adjacent the lower end portion 14 of the body member 12. The pressure drop zone 36 is formed in open fluid communication with the fluid inlets 20. By positioning the boulet 30 and the glide tube 24 in this manner, an expansion zone 38 is formed between the tapered inner wall 26 of the glide tube 24 and the exterior surface 40 of the boulet 30. The expansion zone 38 is formed to be in open fluid communication with the pressure drop zone 36 and the interior chamber 13 of the body member 12. Accordingly, a selectively shaped fluid pathway is defined from the fluid inlets 20 and the interior chamber 13 of the body member 12.

In use, the nozzle 10 is operatively coupled to a source of highly or super-saturated liquid-gas fluid mixture, such as a saturation vessel or other such known device. The saturated liquid-gas mixture enters the nozzle 10 through the fluid inlets 20 and passes through the pressure drop zone 36 and into the expansion zone 38. As the saturated liquid-gas mixture passes through the expansion zone 38 that exits between the boulet 30 and the glide tube 24, it smoothly expands to accommodate the change in bulk density as the gas that was once soluble in the liquid is released from the fluid mixture in the form of micro bubbles. Careful manufacture and assembly of the component parts of the nozzle are preferred, as coarse surfaces or poor-fitting components will tend to greatly reduce the overall efficiency of the production of micro bubbles and will lead to the formation of large or coarse gas bubbles, rather than the desired micro bubbles. The newly formed mixture of liquid and micro bubbles collects within the interior chamber of the body member 12 until it is purged from the nozzle 10 via the fluid outlets 22 to a desired point of use.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. A nozzle for use in working with a liquid that is saturated with a gas, the nozzle comprising:
   a body member having an interior chamber and closed lower and upper end portions;
   at least one fluid inlet formed in the lower end portion of said body member for supplying the liquid to said interior chamber;
   a glide tube, having an open interior portion and lower and upper end portions, positioned within the interior chamber of said body member adjacent said at least one fluid inlet;
   a boulet, having an exterior surface and lower and upper end portions, positioned within the interior portion of said glide tube adjacent the lower end portion of said glide tube; said boulet being positioned within the interior portion of said glide tube so that an open pressure drop zone is formed between the lower end portion of said boulet and the lower end portion of said glide tube; said pressure drop zone being in open operative fluid communication with said at least one fluid inlet; and
   at least one fluid outlet formed in the upper end portion of said body member for purging the liquid and the gas from the interior chamber of said body member.

2. The nozzle of claim 1 wherein the open interior portion of said glide tube is generally tapered upwardly and outwardly.

3. The nozzle of claim 1 wherein the lower end portion of said boulet is generally taped upwardly and inwardly.

4. A method for producing micro bubbles of gas for use in treating waste water, comprising the steps of:
   providing a liquid that is saturated with a gas at a first pressure;
   providing a nozzle, comprising a body member having an interior chamber, a fluid inlet, a fluid outlet, and lower and upper closed end portions, a glide tube having an interior portion positioned within the interior chamber of the body member adjacent the fluid inlet, and a boulet positioned within the interior portion of the glide tube adjacent the fluid inlet;
   inserting said liquid into the fluid inlet of said nozzle at said first pressure so that said liquid is passed between the glide tube and boulet of said nozzle to reduce the liquid to a second pressure and produce micro bubbles of said gas within said liquid;
   accumulating said liquid and said micro bubbles within the interior chamber of said body member; and
   purging said liquid and said micro bubbles from said nozzle through said fluid outlet to a point of use for treating the waste water.

5. The method of claim 4 wherein said glide tube is provided with an inner wall that generally tapers upwardly and outwardly.

6. The method of claim 5 wherein said boulet is provided with an upper portion that generally tapers upwardly and inwardly.

7. The method of claim 6 further comprising the step of positioning the boulet within the glide tube so that an open pressure drop zone is formed adjacent the fluid inlet.

8. The method of claim 6 further comprising the step of positioning the boulet within the glide tube so that an open expansion zone is formed between the tapered inner wall of said glide tube and said boulet.

9. The method of claim 6 further comprising the step of positioning the boulet within the glide tube so that an open pressure drop zone and an open expansion zone are formed between said boulet and said glide tube.

10. A nozzle for producing micro bubbles of gas from a pressurized and gas-saturated liquid, the nozzle comprising:
    a body member having an interior chamber and lower and upper end portions;
    a fluid inlet formed in the lower end portion of said body member;
    a fluid outlet formed in the upper end portion of said body member;
    means positioned within the interior chamber of said body member for reducing the pressure of the gas-saturated liquid so that micro bubbles form from the gas within the gas-saturated liquid.

11. A nozzle for use in working with a liquid that is saturated with a gas, the nozzle comprising:
    a body member having an interior chamber and closed lower and upper end portions;
    at least one fluid inlet formed in the lower end portion of said body member for supplying the liquid to said interior chamber;

a glide tube, having an open interior portion and lower and upper end portions, positioned within the interior chamber of said body member adjacent said at least one fluid inlet;

a boulet, having an exterior surface and lower and upper end portions, positioned within the interior portion of said glide tube adjacent the lower end portion of said glide tube; said boulet being positioned within the interior portion of said glide tube so that an open pressure drop zone is formed between the lower end portion of said boulet and the lower end portion of said glide tube; said pressure drop zone being in open operative fluid communication with said at least one fluid inlet; and at least one fluid outlet formed in the upper end portion of said body member for purging the liquid and the gas from the interior chamber of said body member.

12. The nozzle of claim 11 wherein the open interior portion of said glide tube is generally tapered upwardly and outwardly.

13. The nozzle of claim 11 wherein the lower end portion of said boulet is generally tapered upwardly and inwardly.

14. A nozzle for use in working with a liquid that is saturated with a gas, the nozzle comprising:

a body member having an interior chamber and closed lower and upper end portions;

at least one fluid inlet formed in the lower end portion of said body member for supplying the liquid to said interior chamber;

a glide tube, having an open interior portion and lower and upper end portions, positioned within the interior chamber of said body member adjacent said at least one fluid inlet;

a boulet, having an exterior surface and lower and upper end portions, positioned within the interior portion of said glide tube adjacent the lower end portion of said glide tube; said boulet being positioned within the interior position of said glide tube so that an open pressure drop zone is formed between the lower end portion of said boulet and the lower end portion of said glide tube, and an open expansion zone is formed between at least a portion of the exterior surface of said boulet and the interior portion of said glide tube; said pressure drop zone and expansion zone being in open operative communication with said at least one fluid inlet and the interior chamber of said body member; and at least one fluid outlet formed in the upper end portion of said body member for purging the liquid and the gas from the interior chamber of said body member.

15. The nozzle of claim 14 wherein the open interior portion of said glide tube is generally tapered upwardly and outwardly.

16. The nozzle of claim 14 wherein the lower end portion of said boulet is generally tapered upwardly and inwardly.

* * * * *